United States Patent [19]
Musk et al.

[11] Patent Number: 5,315,680
[45] Date of Patent: May 24, 1994

[54] OPTICAL FIBER CONNECTOR STRUCTURE INCLUDING THREE FERRULES AND AN OPTICAL BAFFLE

[75] Inventors: Robert W. Musk, Suffolk; Christopher F. Beesley, Norfolk, both of England

[73] Assignee: BT&D Technologies, Suffolk, England

[21] Appl. No.: 917,004

[22] PCT Filed: Jan. 16, 1991

[86] PCT No.: PCT/GB91/00080
  § 371 Date: Aug. 11, 1992
  § 102(e) Date: Aug. 11, 1992

[87] PCT Pub. No.: WO91/10932
  PCT Pub. Date: Jul. 25, 1991

[30] Foreign Application Priority Data
  Jan. 16, 1990 [GB] United Kingdom ............... 9000969

[51] Int. Cl.⁵ ............................ G02B 6/26; G02B 6/32
[52] U.S. Cl. ................................... 385/88; 385/33; 385/92; 385/29; 385/76; 385/78; 385/84
[58] Field of Search ................. 385/33, 34, 88, 90, 385/91, 92, 93, 94, 27, 28, 29, 76, 78, 84; 250/227.11

[56] References Cited

U.S. PATENT DOCUMENTS

| | | | |
|---|---|---|---|
| 4,169,656 | 10/1979 | Hodge | 385/33 X |
| 4,199,222 | 4/1980 | Ikushima et al. | 385/93 X |
| 4,919,505 | 4/1990 | Bartosiak et al. | 385/33 X |
| 5,210,815 | 5/1993 | Alexander et al. | 385/33 X |
| 5,216,730 | 6/1993 | Demeritt et al. | 385/33 |
| 5,222,170 | 6/1993 | Bargar et al. | 385/88 |
| 5,239,605 | 8/1993 | Shimada | 385/88 |

FOREIGN PATENT DOCUMENTS

| | | | |
|---|---|---|---|
| 2750322 | 5/1978 | Fed. Rep. of Germany | 385/93 X |
| 58-134489 | 8/1983 | Japan | 385/93 X |
| 60-164713 | 8/1985 | Japan | 385/93 X |

*Primary Examiner*—Brian Healy
*Attorney, Agent, or Firm*—Nixon & Vanderhye

[57] ABSTRACT

An optical transmitter (1) comprises a semiconductor laser optical source (14) housed in an optical fibre connector component. An optical baffle (8) such as a short section of optical fibre ensures that only minimal power is emitted to the environment when the transmission fibre (6) is withdrawn from the connector.

15 Claims, 2 Drawing Sheets

OPTICAL FIBER CONNECTOR STRUCTURE INCLUDING THREE FERRULES AND AN OPTICAL BAFFLE

BACKGROUND

I. Field of the Invention

This invention relates to optical devices and in particular though not exclusively to optical devices housed in optical fibre connectors.

II. Related Art and Other Considerations

Optical devices housed in optical fibre connectors are frequently used in optical communications applications which require relatively inexpensive devices which in addition can be easily connected to and disconnected from an optical fibre transmission line.

The coupling efficiencies of such devices are usually rather low so that, for example, a laser having an optical output of 10 mW may couple only 50 $\mu$W into the associated optical fibre. These low coupling efficiencies do not usually in themselves present a problem since in many applications even 50 $\mu$W of coupled power provides ample optical power.

A problem does however arise in respect of safety, since disconnecting the fibre and its associated ferrule from the device can lead to several milliwatts of power being emitted into the environment through the fibre receptacle of the connector.

In many cases optical communications links are operated at wavelengths of 1.3 and 1.5 micrometers which presents added risks because radiation at these wavelengths is invisible.

The present invention aims to improve the safety of such optical devices incorporating optical sources having a relatively high intensity or high power output.

SUMMARY

According to a first aspect of the present invention an optical device comprises an optical source and means for connecting the source to an optical transmission waveguide, an optical baffle.

According to another aspect of the present invention, an optical transmitter device comprises an optical source and means for connecting the source to an optical transmission waveguide, wherein the connecting means comprise an optical baffle.

Preferably, the optical baffle comprises an optical waveguide, the baffle waveguide is conveniently mode matched to the optical transmission waveguide.

Preferably, the baffle waveguide comprises an optical fibre waveguide.

In a preferred form of the present invention, the optical device is housed in an optical fibre connector having an optical fibre receptacle arranged such that the optical fibre, when inserted, abuts against the baffle waveguide.

The optical transmission waveguide is typically an optical fibre waveguide, and the baffle waveguide is preferably arranged for optical energy to be coupled primarily into the core region of the optical transmission fibre. In addition, the baffle waveguide may be arranged to provide absorption of optical energy propagating as "cladding modes". This may be achieved by securing the baffle waveguide with index matched adhesive arranged to strip cladding modes from the waveguide.

The optical source is preferably housed in a separate enclosure which is provided with a window through which the optical radiation is coupled into the baffle waveguide. The window may be a planar window or comprise a graded index or other lens arrangement.

The optical source will usually be a laser, but similar problems arise and may be overcome by adopting the present invention where the source comprises a high power LEDs (light emitting diode) or optical amplifiers.

In order to reduce back reflections through the window into the enclosure, several measure may be taken singly or in combination:

The window may have a small aperture, the end face of the baffle waveguide and/or the end face of a support member for the baffle waveguide facing the source may be shaped or positioned or inclined so as to reduce reflections back through the window of the enclosure. In addition, any surfaces exposed to reflections may be coated with a radiation-absorbing coating.

BRIEF DESCRIPTION OF THE DRAWINGS

The invention will now be described further by way of example with reference to the accompanying drawings of which.

DETAILED DESCRIPTION OF THE DRAWINGS

Figure 1:
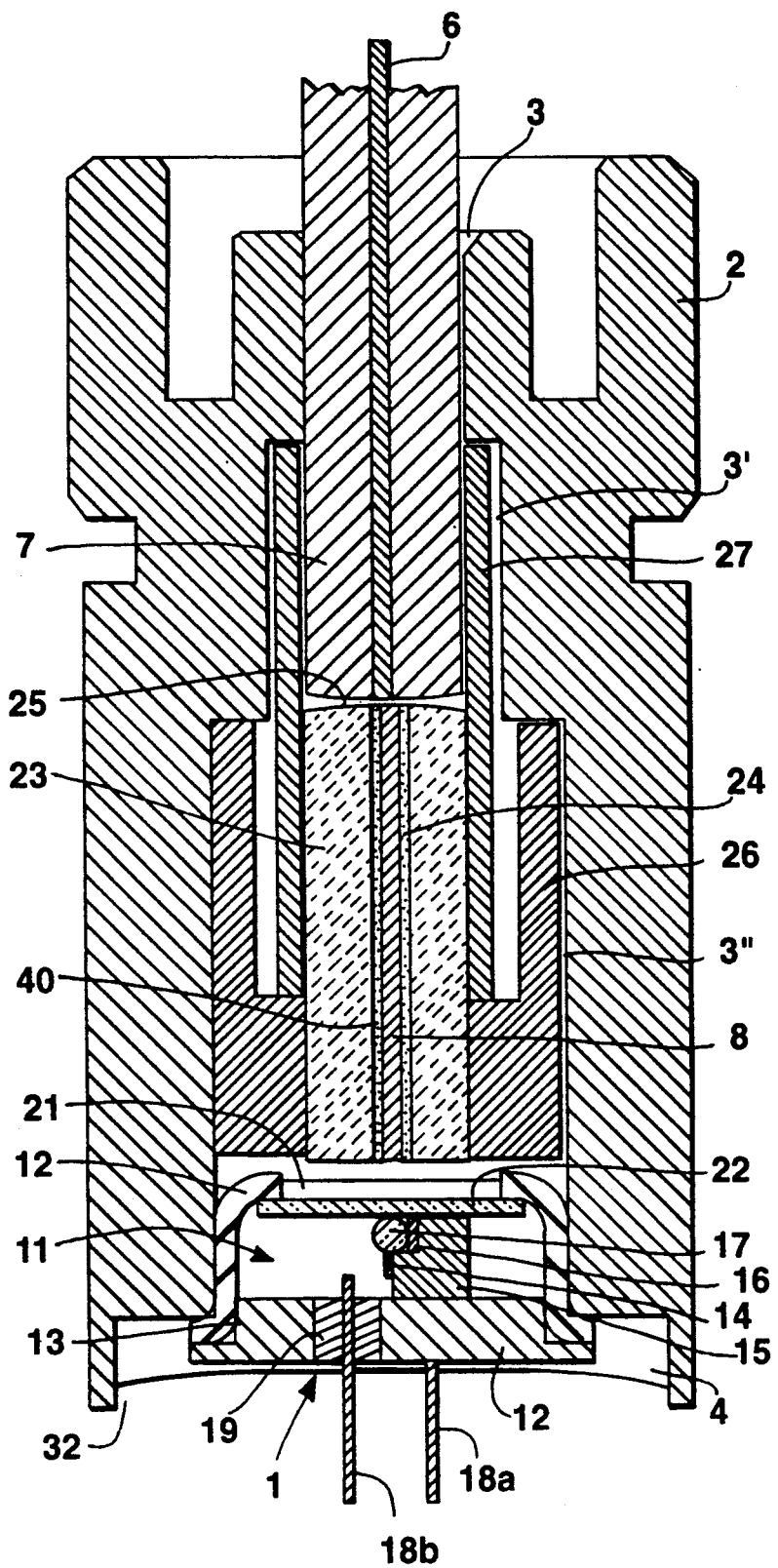
FIG. 1 is a sectional view of a first embodiment of an optical device according to the present invention.

Referring now also to the drawings, an optical transmitter 1 is mounted in a housing 2 of an optical fibre connector. The housing 2 has a multiply-stepped axial bore 3. At one end 32 of the bore 3 is mounted the transmitter 1, secured to the housing 2 by organic adhesive 4 which also provides some backfill to the associated open end 32 of the housing 2.

The transmitter 1 comprises a base plate 12 (also referred to as a 'header'), which together with a metal can 13 forms a sealed enclosure 11 housing a laser 14 mounted on a heat sink 15. Also mounted on the heat sink 15 is a monitor diode 16, and on the monitor diode 16 a spherical lens 17 which collimates the light output of the laser 14. The lens 17 also serves to scatter light from the laser 14 into the monitoring diode 16 in the manner described in Published European Patent Application No. 88311258.3 in the name of the present applicants.

Electrical connections to the laser are via pins 18a and 18b of which pin 18a is electrically connected to the header 12 and provides electrical connection to the laser 14 by way of the heat sink 15. The other electrical connection is by way of pin 18b which passes through an insulating seal 19 into the interior of the enclosure 11 and is electrically connected via a bond wire 20 (see FIG. 2) to an appropriate contact on the laser 14.

The can 13 has in its top wall 12 an aperture 21. The aperture is sealed by a window 22 transparent to the radiation output of the laser 14.

Other arrangements of light source and lenses may, of course, be used instead, such as for example a conventional arrangements employing graded index (GRIN) lenses.

At its end opposite the transmitter 1, the axial bore 3 is open to provide a receptacle for an optical fibre 6 located in a connector ferrule 7. Another ferrule 23, supporting the baffle waveguide 8, is secured within the portion 3" of the central bore 3. The waveguide 8 is located in a central bore 24 of the support ferrule 23, and is secured with the bore 24 by adhesive 40. The adhesive 40 is preferably an index matched adhesive to assist in stripping "cladding modes" from the baffle waveguide 8. The waveguide 8 is most conveniently a length of optical fibre.

The ferrule 23 has the same external diameter as the connector ferrule 7. Radiation from the laser 14 is coupled via the spherical lens 17 and the window 22 into the waveguide 8. The ferrule 23 may be a ceramic ferrule polished into a domed surface at its end face 25 away from the optical transmitter 1, to provide good coupling to the optical fibre 6.

The ferrule 23 is held in place by a ferrule holder 26 which makes a push fit with the associated part 3" of the stepped bore 3 and, in addition, is secured in place by means of adhesive. Fitted about the ceramic ferrule 23 is a split ferrule 27, which is arranged to centre and lightly clamp the end of the connector ferrule 7 supporting optical fibre 6 when inserted. In order to allow a small amount of radical expansion of the split ferrule 27, to accommodate variation in diameter of the ferrule 7, its external surface makes a loose fit within the corresponding section 3' of the axial bore 3.

The precise external shape of the housing 2 and any alignment surfaces will, of course, be determined by the need for matching which ever type of optical fibre connector is employed.

Figure 2:
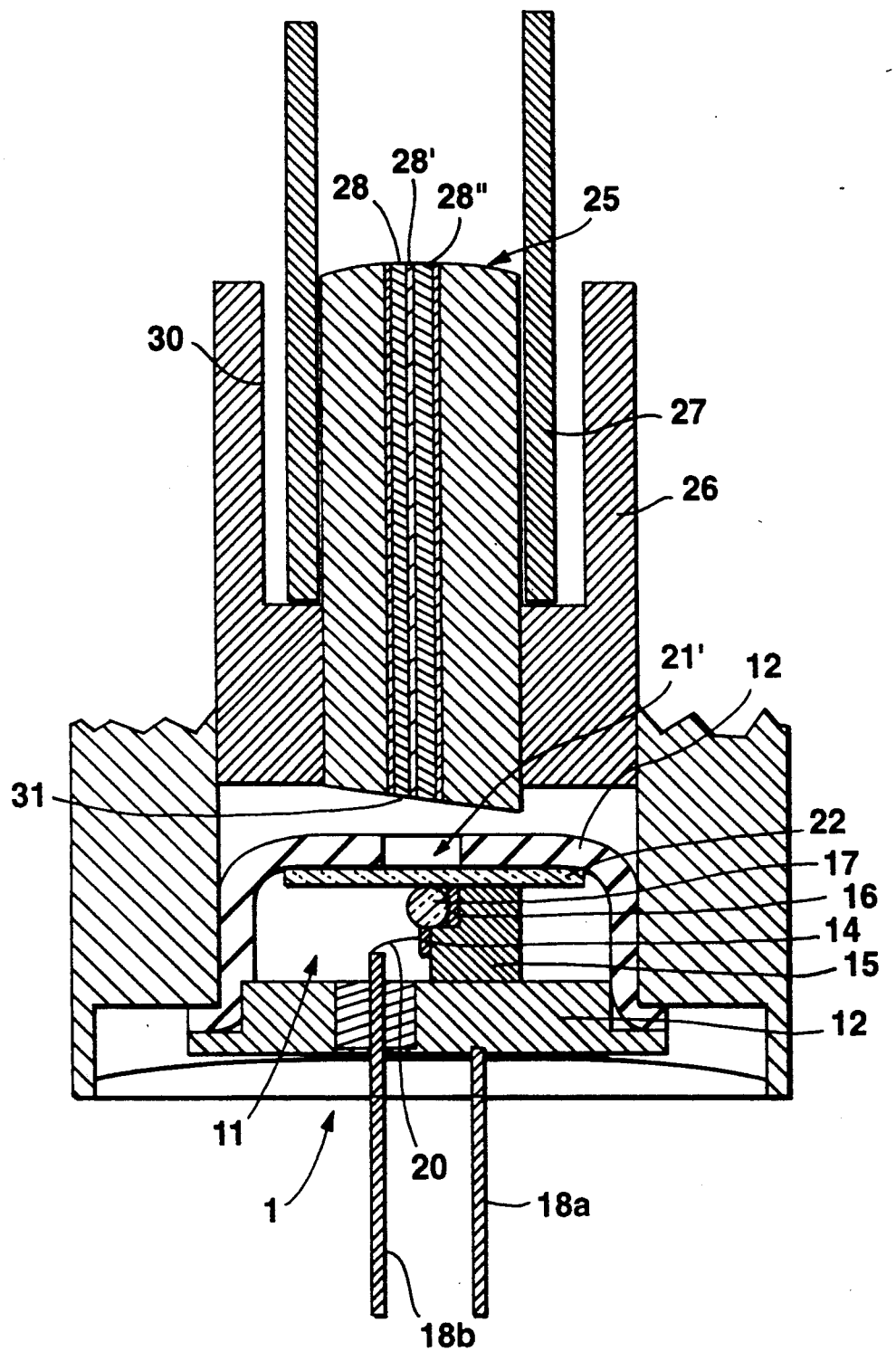
FIG. 2 is an enlarged sectional view of part of a modified embodiment of the invention.

FIG. 2 is an enlarged sectional view of part of the optical fibre connector of FIG. 1. FIG. 2 illustrates a combination of modifications each of which may be adapted on its own.

In order to reduce back reflections into the transmitter enclosure 11, the end face 31 of the ferrule 23 which is adjacent the window 21' is set at an angle to the bore axis. This contributes to reflections being directed by the angled end face 31 into the cavity surrounding the can 13 of the transmitter 1 rather than back into the enclosure 11. Reflections into the enclosure 11 of transmitter 1 may be reduced also by employing a relatively small aperture 21' in the top wall of the can 13.

Instead of an optical fibre 28 with a core region 28' and cladding 28", some other optical waveguide (e.g. a lithium niobate waveguide) may be used. The waveguides may be single or multi mode, but are preferably approximately mode-matched to reduce coupling losses. Nevertheless, other consideration may override this criterion as in the case where an electro-optic waveguide is used, for example, to provide control of the emitted optical signal.

In prior art devices the optical transmission fibre was arranged to have its end face either located in close proximity to or even abut against the window in the can of the transmitter. Alternatively, power from the transmitter was focused via a large aperture graded index lens onto the end face of the transmission fibre. In either case, removal of the fibre would allow a very much greater optical power to be emitted from the open connector than would be coupled into the fibre under normal operating conditions.

For example, a laser may readily provide an output of 5 to 10 milliwatts, of which only approximately 50 milliwatts would typically be coupled into the core of the transmitting fibre. Hence, while the power levels encountered in operation would be well within safe limits, disconnecting the fibre by removing it from the connector receptacle could expose the environment to optical radiation of a power sufficiently high to constitute a safety and health hazard. By providing an optical baffle, the present invention largely avoids this problem and greatly improves the handling safety of such devices.

We claim:

1. An optical device comprising:
   a housing;
   an optical source positioned within the housing;
   a first ferrule for receiving an end of an optical transmission waveguide;
   a second ferrule having an optical baffle disposed therein;
   a third ferrule inserted in the housing for receiving at least a portion of the second ferrule and at least a portion of the first ferrule, whereby the second ferrule is disposed between the optical source and the first ferrule whereby the source, the optical baffle, and the optical transmission waveguide are optically aligned within the housing, the first ferrule and the second ferrule having substantially the same external diameters.

2. A device according to claim 1 in which the optical baffle comprises an optical waveguide.

3. A device according to claim 1 in which said optical waveguide of the optical baffle is mode matched to the optical transmission waveguide.

4. A device according to claim 1 comprising a housing formed by a component of an optical fibre connector.

5. A device according to claim 1 in which means are provided for absorbing radiation not coupled into the transmission waveguide.

6. A device according to claim 1 in which the optical source is housed in a separate enclosure which is provided with a window through which the optical radiation is coupled into the baffle waveguide.

7. A device as claimed in claim 1 in which the baffle is shaped to reduce reflection of optical radiation back into the source.

8. A device as claimed in claim 1 in which the baffle is positioned to reduce reflection of optical radiation back into the source.

9. A device according to claim 1 wherein the optical source comprises a semiconductor laser.

10. A device as claimed in claim 1 in which the optical baffle comprises a short section of optical fibre.

11. The device of claim 11, wherein the third ferrule is a split ferrule.

12. The device of claim 1, further comprising a ferrule holder for holding the second ferrule in a predetermined position in the housing.

13. The device of claim 1, wherein the housing has a multiply-stepped axial bore with
   a first segment of the bore which receives the second ferrule and the third ferrule having a larger diameter than a second segment of the bore;
   the second segment of the bore receiving a first length portion of the first ferrule;
   a third segment of the bore receiving a second length portion of the first ferrule and the third ferrule, the third segment having a diameter greater than the diameter of the second segment but less than the first segment.

14. The device of claim 1, wherein an end of the second ferrule and the optical baffle disposed therein are formed as a plane inclined at an angle to a central axis of the optical waveguide.

15. The device of claim 1, wherein an end of the second ferrule and the optical baffle disposed therein are formed as a domed surface.

* * * * *